United States Patent [19]
Bianchini, Jr.

[11] Patent Number: 5,537,653
[45] Date of Patent: Jul. 16, 1996

[54] METHOD FOR ON-LINE DIAGNOSIS FOR DISTRIBUTED NETWORK SYSTEMS

[75] Inventor: Ronald P. Bianchini, Jr., Pittsburgh, Pa.

[73] Assignee: Carnegie Mellon University, Pittsburgh, Pa.

[21] Appl. No.: 409,535

[22] Filed: Mar. 24, 1995

Related U.S. Application Data

[63] Continuation of Ser. No. 985,569, Dec. 3, 1992.
[51] Int. Cl.$^6$ .................. G01R 31/28; G06F 11/00
[52] U.S. Cl. .................. 395/183.01; 395/182.02; 395/183.07; 395/183.19
[58] Field of Search .................. 395/575, 908, 395/909, 916, 917, 183.01, 183.02, 183.07, 182.02, 183.19; 371/15.1, 8.2, 11.2

[56] References Cited

U.S. PATENT DOCUMENTS

| | | | |
|---|---|---|---|
| 4,451,916 | 5/1984 | Casper | 371/8.2 |
| 4,709,365 | 11/1987 | Beale | 371/11.2 |
| 4,747,100 | 5/1988 | Roach | 370/86 |
| 4,872,165 | 10/1989 | Mori | 371/11.2 |
| 4,912,656 | 3/1990 | Cain | 365/514 |
| 4,991,174 | 2/1991 | Mori | 371/15.1 |
| 5,016,243 | 5/1991 | Fite | 371/8.2 X |
| 5,173,689 | 12/1992 | Kusano | 371/8.2 X |
| 5,218,601 | 6/1993 | Chujo | 371/11.2 X |
| 5,265,241 | 11/1993 | Arnold | 395/575 |
| 5,295,244 | 3/1994 | Dev | 395/161 |
| 5,325,518 | 6/1994 | Bianchini, Jr. | 395/575 |
| 5,337,320 | 8/1994 | Kung | 371/15.1 |

OTHER PUBLICATIONS

J. Tyszer, A Multiple Fault-Tolerant Processor Network Architecture for Pipeline Computing, IEEE Transactions on Computers, vol. 37 No. 11, Nov. 1988, pp. 1414–1418.

Hosseini et al., Distributed, Dynamic, and Efficient Testing of Large Scale Multiple Processor Systems, IEEE Parallel and Distributed Processing Proceedings, 1990, pp. 208–214.

Somani et al., Distributed Diagnosis Algorithms for Regular Interconnected Structures, IEEE Transactions on Computers, Jul. 1992, pp. 899–906.

Stahl et al., Simulation of the Adapt On-Line Diagnosis Algorithm for General Topology Networks, 11th Symposium on Reliable Distributed Systems, Oct. 1992, pp. 180–187.

S. L. Hakimi, K. Nakajima, "On Adaptive System Diagnosis," *IEEE Transactions on Computers*, C–33, 3, (Mar. 1984), pp. 234–240.

S. L. Hakimi and E. F. Schmeichel, "An Adaptive Algorithm for System Level Diagnosis," *Journal of Algorithms*, 5, 526–530 (1984).

S. L. Hakimi and A. T. Amin, "Characterization of Connection Assignments of Diagnosable Systems," *IEEE Transactions on Computers*, C–23, 1, 86–88 (Jan. 1974).

F. P. Preparata, et al., "On the Connection Assignment Problem of Diagnosable Systems," *IEEE Transactions on Electronic Computing EC–16*, 12, 848–854 (Dec. 1967).

*Primary Examiner*—Robert W. Beausoliel, Jr.
*Assistant Examiner*—Glenn Snyder
*Attorney, Agent, or Firm*—Reed Smith Shaw & McClay

[57] ABSTRACT

An on-line adaptive distributed diagnostic method for use in an arbitrary network comprised of N nodes, where N is greater than or equal to 3. The algorithms of the present invention provide on-line diagnosis in the presence of node and link failure. In the network, each node is capable of executing an algorithm used in the diagnostic method to update a packet which communicates between network nodes.

10 Claims, 2 Drawing Sheets

METHOD FOR ON-LINE DIAGNOSIS FOR DISTRIBUTED NETWORK SYSTEMS

This is a continuation of application Ser. No. 07/985,569 filed on Dec. 3, 1992, now abandoned.

FIELD OF INVENTION

An on-line adaptive distributed system level method for diagnosing general topology networks; and, in particular, a method for a network in which tests performed by fault free network nodes produce accurate results and test performed by faulty nodes produce arbitrary results.

BACKGROUND OF THE INVENTION

Distributed on-line diagnosis methods (algorithms) are known. For example, in one such system each node of a distributed system is capable of diagnosing the state of all system resources, based on locally maintained information. This method operates correctly in the presence of dynamically occurring fault events. This method is prohibitive for implementation in practical systems due to high overhead. The overhead includes inter-node testing and messages required to distribute diagnosis information.

Adaptive testing methods have addressed the costs of redundant tests required to accommodate multiple faults with a fixed testing assignment. An adaptive testing method was developed that is executed by a central observer and issues only those tests required for diagnosis. In another method, a distributed adaptive testing was devised where testing decisions are made locally by the nodes of a distributed network. The former method executes off-line, requiring that no fault events occur during algorithm execution and the latter method requires a fully connected network. The latter method requires the minimum overhead to perform the system-level diagnosis task.

The latter adaptive method is implemented in a network of over 200 workstations at Carnegie Mellon University. By distributing its execution to the fault-free workstations, it has executed continuously for over 1.5 years, even though no single workstation was fault-free for the entire period. See U.S. Pat. No. 5,325,518 assigned to the assignee of the present invention.

Recently, a method was presented for on-line execution in arbitrary topology networks. Additionally, considerable work has been done in other distributed methods that can be applied to distributed diagnosis, including leader election. Leader election algorithms are based on distributed spanning tree construction. That work has resulted in several algorithms with lower complexity. However, these diagnostic algorithms require a stable network environment during execution and are thus not directly applicable to on-line diagnosis.

Accordingly, it is an objective of the present invention to provide on-line adaptive distributed diagnosis in arbitrary networks in the presence of both node and link failures. It is a further objective of the present invention to provide a diagnostic method which has lower overhead and better execution bounds.

SUMMARY OF THE INVENTION

Generally, the present invention provides periodic testing and allows dynamic failure and repair of nodes and links. In particular, the invention provides an on-line adaptive distributed diagnostic system for use in arbitrary networks and executes periodically in passive phase and active phase.

The diagnostic system of the present invention comprises a network having N nodes where N is an integer equal to or greater than 3. Each of the network nodes is assumed to be capable of executing the algorithms of the present invention and each of the nodes is in communication with at least one other node through a network link. The present invention also assumes the PMC fault model [IEEE Transactions on Electronic Computing E-C-16(12) Dec. 1967 p. 230–237]. Moreover, the nodes can be arbitrarily connected.

In the present invention, all nodes are diagnosed correctly in the presence of node and link failures. The diagnostic algorithm constructs a testing assignment that contains a directed path from every fault-free node to every remaining node, providing the network is connected. If the network is disconnected, the invention operates correctly in each connected component. Other advantages of the present invention will become apparent from the following detailed description of presently preferred embodiments.

DETAILED DESCRIPTION

Figure 1A:
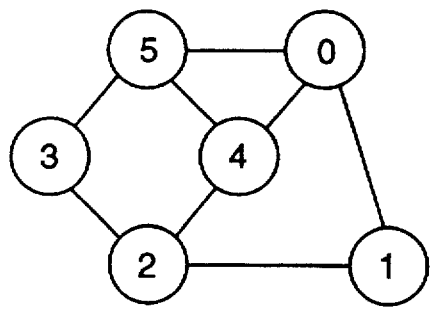
FIG. 1A illustrates an arbitrary network having six nodes.
Figure 1B:
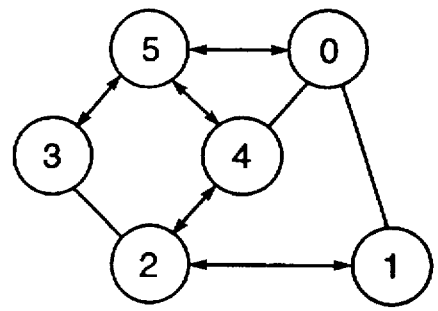
FIG. 1B illustrates an initial testing assignment determined by the present application for the arbitrary network of FIG. 1A wherein each thick arrow points from a tester node and to a node tested by that tester node.
Figure 1C:
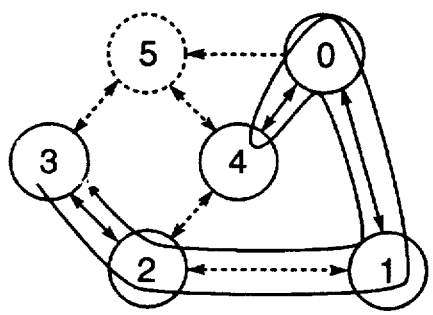
FIG. 1C and 1D illustrate a fault event in which node 5 fails and in which node 3 and node 4 initiate packets in the active phase wherein each thin arrow represents the path of a packet as it traverses the network formed by the fault-free nodes and wherein the thick light-colored arrows represent the initial testing assignment of FIG. 1B and the thick dark-colored arrows represent new tests added as the packets traverse the network.
Figure 1D:
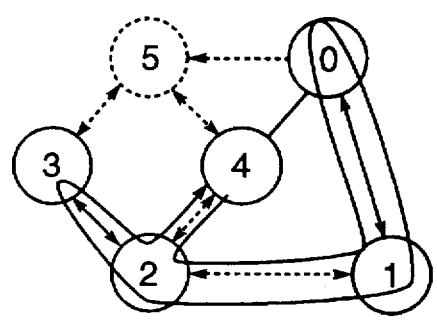
Figure 1E:
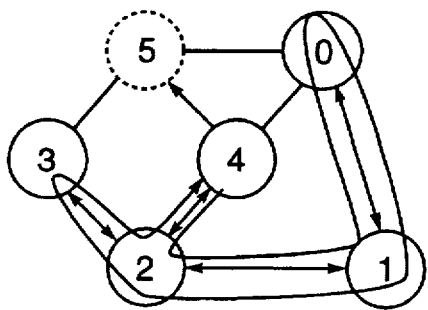
FIG. 1E illustrates the formation of a new testing assignment based on the path of the last packet, the one initiated by node 4, to traverse the network of fault-free nodes.
Figure 1F:
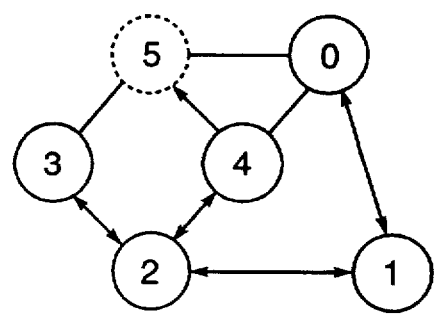
FIG. 1F illustrates the resulting testing assignment.
Figure 1G:
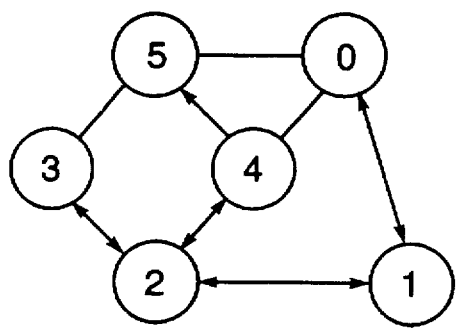
FIG. 1G illustrates the recovery of node 5 from its fault event.

The diagnostic algorithm of the present invention executes in two phases: passive and active. In the passive phase, a fixed testing assignment is utilized as shown in FIG. 1B. The testing assignment guarantees that any fault event is detected by at least one fault-free node. The active phase is initiated at the detection of a fault event, as illustrated in FIGS. 1C and 1D, wherein nodes 3 and 4, respectively, detect the failure of node 5. The fault-free nodes coordinate the construction of a new testing assignment and update the current diagnosis, as depicted in FIGS. 1E and 1F. Once the testing assignment is constructed the method reverts to its passive phase.

The method detects any fault event that occurs during either passive or active phases. The active phase requires at most $O(N^2)$ messages and incurs a diagnosis latency of $O(N)$, wherein $O(N)$ represents "on the order of N". Previous on-line algorithms require the same $O(N^2)$ messages but have $O(N^2)$ diagnosis latency. Other off-line algorithms require at most $O(N\log_2 N)$ messages with diagnosis latency of $O(N)$, but requires off-line execution.

DATA STRUCTURES OF THE PRESENT INVENTION

Each node N has a unique identification number, nodeid, and maintains the total number of nodes in the network, nodenum, as a constant. The method can be modified for a variable number of nodes, by incorporating the appropriate data structures, i.e. linked lists instead of arrays, and taking appropriate action when information concerning a new node is received.

The primary data structure used in the present invention is an array of event time stamps, event, that is used to order events. The event array contains nodenum entries, one for each node in the network. Node $n_i$ increments its time stamp, event[i], whenever a new fault event is detected by $n_i$.

Each node maintains a diagnosis array, containing a flag for each node, identifying the node as either "FaultFree" or "Faulty". The tests array contains expected tests results. For example, $n_i$ stores tests[j]="FaultFree", if a test of $n_j$ by $n_i$ is expected to yield a fault-free result. Expected results are "FaultFree", "Faulty" and "NoTest", if $n_i$ is not expected to test $n_j$.

Inter-node messages include the following packet data structure: an event array, pkt.event; a pkt.from array that records the predecessor of each node during packet propagation; the pkt.topology array that contains a potential final testing assignment; and the pkt.istested array that identifies whether a faulty node is currently tested in the assignment.

PACKETS

Figure 1H:
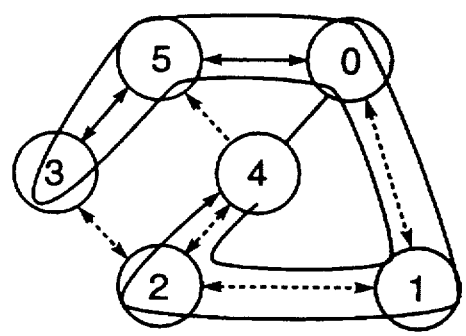
FIG. 1H illustrates node 4 initiating a packet in the active phase upon recovery of node 5.
Figure 1I:
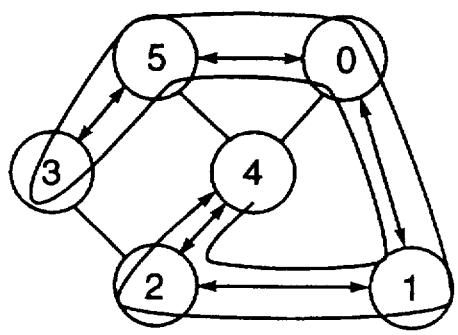
FIG. 1I illustrates the formation of a new testing assignment based on the path of the packet initiated by node 4.
Figure 1J:
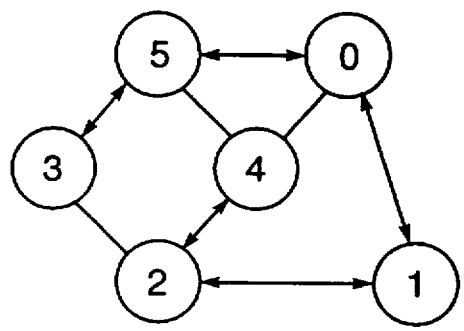
FIG. 1J illustrates the resting testing assignment.

The present invention utilizes packets to distribute and coordinate information between nodes. A packet is termed complete after it traverses all fault-free nodes and returns to its root node. The path traversed by completed packets determines the testing assignment, as illustrated in FIGS. 1E and 1I. Each packet traverses the network using a depth-first search methodology which results in a tree propagation path represented by the thin arrows in FIGS. 1C, 1D, 1E, 1H and 1I. When a packet that is transmitted from $n_j$ arrives at $n_i$ for the first time, $n_i$ records pkt.from[i]=j. After a packet traverses every fault-free node for the first time, the propagation path is reconstructed using pkt.from, and the packet then backtracks to its root node.

DESCRIPTION OF INVENTION

An outline of the preferred algorithm of the present invention is given below:

```
/*Passive phase. Periodically test assigned nodes*/
PeriodicTest( )
{
1.    test array identifies neighbors to test;
2.    if (result not expected) StartEventPacket( );
}
/*Start active phase*/
StartEventPacket( )
{
1.    increment event[nodeid];      /*increment my event time*/
2.    pkt.event=event;              /*set pkt event to current*/
3.    pkt.topology =-1;             /*testing assign, unknown*/
4.    pkt.from =-1;                 /*packet propagation path*/
```

```
5.    if (∃fault-free neighbor, n_x){
5.1       Send pkt to n_x;          /*propagate packet*/
5.2       Add n_x to tests array;   /*continue testing n_x*/
      }
}
/*Continue active phase by propagating packets.*/
ReceivePacket(fromid)
{
1.    if (pkt.from[nodeid]==-1)pkt.from[nodeid]=fromid;
2.    maximize (pkt.event,event);   /*update event arrays*/
3.    if (pkt.event is changed in 2) pkt.topology=-1;
4.    if (pkt.topology!=-1) set tests and diagnosis with
          pkt.topology;
5.    if (pkt. !complete){           /*not root node*/
5.1       if (pkt.topology ==-1)n_x is a fault-free neighbor;
5.2       else n_x is non-visited neighbor on topology; /*child*/
5.3       if (∃n_x)nx = pkt.from[nodeid];
*parent*/
5.4       Send pkt to n_x;           /*propagate packett*/
5.5       if (event is changed in 2) Add n_x to test array;
6.    } else if ((pkt.event has     || (pkt.topology==-1){
          changed)
6.1       pkt.event =event;          /*latest event array*/
6.2       pkt.topology = pkt.from;   /*testing assignment*/
6.3       pkt.from =-1;              /*pkt propagate path*/
6.4       Send pkt to neighbor in pkt.topology;
      }
}
```

["∃" means "there exists a"]
["∄" means "there does not exist"]

During passive phase operation, as depicted in FIG. 1B, periodic tests are performed in the PeriodicTest procedure, no packets are transmitted and every node contains the most recent diagnosis array. A fault event is detected by a changed periodic test result in Step 2. As shown in FIGS. 1C, 1D and 1H, the StartEventPacket procedure is executed and initiates the active phase. The StartEventPacket procedure increments the current node's event array entry in Step 1, and initiates a new packet. The packet includes the most current event array from the node (Step 2), a null proposed testing assignment (Step 3), since the packet has not yet generated the current network topology, and a cleared packet propagation path (Step 4). The packet is forwarded to a neighboring fault-free node in Step 5.1.

The active phase of the invention is continued at each node by the ReceivePacket procedure that is executed when the node receives a packet. In Step 1 of ReceivePacket, the parent of the current node is recorded in the packet during its first visit to the node. In Step 2, each entry of the node and packet event arrays are compared, and both are set equal to the maximum value. The suggested testing assignment is cleared in Step 3 if the packet event array has been updated. In Step 4, the testing assignment is set to the packet propagation path, if the packet is the most current packet received by this node. A "tie breaking" strategy is required, as shown in Appendix A, for two packets with the same event arrays from different root nodes. The packet is propagated in Step 5 using a depth-first search method. Step 6 is executed once the packet has completed, such that it has propagated to all fault-free nodes and returned to its root node. At completion, if the packet has been updated (pkt.topology=-1), a new packet with the current event array is propagated to attempt to set the testing assignment. The active phase terminates once a packet completes that is not updated. The traversal of that packet sets the final testing assignment, as illustrated in FIGS. 1E and 1I.

MULTIPLE FAULT EVENTS

In Step 5.2 of the StartEventPacket procedure and Step 5.5 of the ReceivePacket procedure a test of the node to receive the current packet is added. These tests are represented by the thick dark-colored arrows in FIGS. 1C, 1D and 1H. These tests are added during the active phase to guarantee that additional fault events are detected. All fault events are detected in the passive phase, since every node is tested in the testing assignment. However, once a fault event occurs and the active phase is started, all nodes are not necessarily tested. For example, when node 5 fails in FIG. 1B, nodes 0 and 3 are no longer tested by a fault-free node. Thus, a packet that is required to complete in the active phase can be transmitted to a non-tested node, which subsequently fails and goes undetected, resulting in packet loss. This problem is avoided by adding tests, such that there is always a testing path from the root of any packet with new information to that packet. Thus, if a node fails along that path, it will be detected and the active phase is re-started. Ideally, all packets should be routed via the same tree in the active phase to minimize additional tests. For example, a test is added between nodes 0 and 4 in FIG. 1C, but not in FIG. 1D, because the packets initiated by nodes 3 and 4 take different paths. However, since the final testing assignment is not fixed, tests are added on all paths taken.

EXECUTION CORRECTNESS

The validity of the present invention is demonstrated as follows: First, all fault events are detected; and, second, when a fault event is detected, the active phase is initiated and completes, resulting in correct diagnosis and a valid testing assignment for the passive phase.

To demonstrate that all fault events are detected, the execution phase at the fault event is considered. All fault events must be detected during the passive phase since the testing assignment forms a tree of the network nodes. For any set of nodes included in a fault event, there is at least one fault-free node that is testing a node in the fault set. All fault events are shown to be detected during the active phase, since at least one packet is generated during the active phase and that packet traverses a spanning tree of the fault-free nodes. Every node that receives a packet eventually forwards that packet to all of its fault-free neighbors, implying a test of all of its neighbors.

Thereafter, the active phase must complete after a fault has been detected due to the augmentation of the testing assignment described above. The active phase does not complete properly if the packet with the newest fault event array does not complete. A packet does not complete if it is forwarded to a node that fails in an undetected fashion before it can propagate the packet. Thus, considering a packet that is started with a new fault event entry as a result of a detected fault, the method always adds tests on the propagation path of that packet ensuring that either the packet completes or a new node failure on the packet propagation path is detected, causing the active phase to be continued. Additional testing is not required for packets with only old event entries since a packet with newer information must have previously been propagated. Thus, within a bounded time after the last fault event, the active phase completes. At this point, the current diagnosis and passive phase testing assignment must be correct at completion, since all fault-free nodes utilize the same assignment included in the packet with the newest event array for calculation.

EXECUTION BONDS

An analysis of the present invention is provided in terms of its communication overhead, measured as message count, and diagnosis latency, measured in rounds. A round is defined as the time required by a node to process and forward a received message. Transmission time is assumed to be negligible. Diagnosis latency is the delay from fault detection to correct diagnosis. The procedure is evaluated for steady state and dynamic behavior for the worst case performance bounds for message count, test count, and diagnosis latency for a single node failure and subsequent repair. A description of the worst case performance is set out below.

During periods with no fault events, the passive phase is executed. Passive phase execution requires 0 messages and at most 2N tests, since the testing assignment is limited to twice the number of edges in a tree.

Once a fault event occurs, the active phase is entered. The number of messages that can simultaneously exist in the active phase is limited to p, the number of nodes that detect the fault event. The detecting nodes initiate packets sequentially, such that a new packet is added only after a previous packet completes a round. For example, node 4 in FIG. 1D does not send its packet until node 3 in FIG. 1C has directly forwarded its packet to node 2. Diagnosis latency is determined by considering the last node to detect a fault event. That node initiates a packet that contains the newest event array entries at completion since there are no subsequent detections. That packet completes after 2N rounds and forwards another packet with the newest event array and potential testing assignment. That packet completes and all other nodes are updated by 4N rounds. The total message count from the last detection to the end of the active phase is 4pN. For node repair a single node detects the event, thus, $p=1$.

The number of tests required during the active phase increases over the passive phase due to the extra tests required for following packet propagation. In worst case, each of the p packets use $N-1$ distinct edges resulting in 2pN worst case tests. The number of transient tests is expected to be significantly lower due to the ability for the packets to share edges. See Appendix A.6.

EXTENSIONS

The active phase correctly diagnoses all node failures in the presence of node and link failures. The packet propagate algorithm routes a packet around faulty links by attempting to forward a packet to a node at all fault-free neighbors until the node is included in the packet propagation path. The passive phase does not operate correctly with link failures, since faulty nodes are tested by only one fault-free neighbor. If that link remains faulty when the node is repaired, the repair is undetected. Link failures are tolerated by removing the istested array and requiring a faulty node to be tested by every neighbor.

As described above, the procedure diagnoses unreachable nodes as faulty. Thus, in a network that is disconnected by a fault event, every node correctly diagnoses all nodes in its connected component; the remaining unreachable nodes are currently diagnosed faulty. Unreachable nodes can be distinguished from faulty nodes by forwarding the istested array with the final active phase packet.

To improve performance, the testing assignment utilized during the passive phase can be any strongly connected graph, instead of a tree, reducing the number of tests required during the passive phase to the range from N to 2N. This is accomplished by forwarding any strongly connected testing assignment in pkt.topology rather than the previous packet propagation path. A Hamiltonian cycle is the lowest cost strongly connected graph, requiring N tests.

In addition, the $O(N^2)$ total message bound may be reduced by considering partial event comparison. Currently, all transmitted packets return to their root node and either terminate or restart as determined by a comparison of the entire packet and node event arrays. Alternatively, the packet can be terminated earlier, at other nodes in the network, if that node has currently forwarded a packet that supersedes part of the arrived packet event record. An additional complexity analysis is required.

While presently preferred embodiments of the invention have been described in particularity, it may be otherwise embodied within the scope of the appended claims.

A. Appendix

A.1 Node Data Structures

```
int    nodenum;                /*total number of nodes*/
int    nodeid;                 /*current node's id number*/
int    event[nodenum];         /*current event times*/
flag   diagnosis[nodenum]  oneof{FaultFree, Faulty};
flag   tests[nodenum]      oneof{FaultFree, Faulty, NoTest};
int    testrootid;             /*tie breaker for updating tests*/
struct {
  int  rootevent;              /*event of root node at start*/
  int  event[nodenum];         /*collected event times*/
  int  from[nodenum];          /*records packet propagation path*/
  int  topology[nodenum];      /*topology for nodes to set tests*/
  char istested[nodenum];      /*is faulty node tested*/
}pkt;
```

A.2 Initialization Procedure
```
Initialize()            /*executed at node start-up or repair*/
{
  for (i=0; i<nodenum; i++) {
    event[i] = -1;                      /*init event times*/
    if (i == nodeid) diagnosis[i] = FaultFree;
```

```
      else diagnosis[i] = Faulty;    /*all nodes faulty*/
      if (node i is a testable neighbor) tests[i] = Faulty;
      else tests[i] = NoTest;         /*test all neighbors*/
  }
}
```

A.3 Periodic Test Procedure

```
PeriodicTests(tests)                  /* perform periodic tests*/
{
  for (i=0, i<nodenum, i++)
    if (tests[i] != NoTests) {
      result = oneof{FaultFree, Faulty} |result of test of
      node i;
      if (result != tests[i]{         /*new fault event*/
        tests[i] = result;
        StartEventPacket();
      }
    }
}
```

A.4 Procedure to Start Packet at Fault Event

```
StartEventPacket()                    /*start diagnosis procedure*/
{
  event[nodeid] = event[nodeid] + 1,  /*increment event time*/
  for (i=0; i<nodenum; i++) {
    pkt.event[i] = event[i];          /*set pkt events*/
    pkt.from[i] = -1;                 /*clear packet path*/
    pkt.topology[i] = -1;             /*set pkt topology*/
  }
  pkt.from[nodeid] = nodeid;          /*nodeid is root*/
  ForwardPacket(pkt, TRUE),           /*start packet*/
}
```

A.5 Procedure to Update Tests

```
SetTests(pkt)
}
  for (i=0; i<nodenum; i++){
    tests[i]=NoTest;                              /*clear tests*/
    if (pkt.topology[i] != -1) diagnosis[i] = FaultFree,
    else diagnosis[i] = Faulty;                   /*set diagnosis*/
}
```

```
if (pkt.topology[nodeid] != nodeid)            /*not root node*/
   tests[pkt.topology[nodeid] = Fault Free;    /*test parent*/
for (i=0; i<nodenum; i++) if (node i is a neighbor)
   if (pkt.topology[i] == nodeid) {
      tests[i] = FaultFree,                    /*test child*/
   } else if ((pkt.topology[i]==-1) && (!pkt.istested[i])){
      tests[i] = Faulty;                       /*faulty neigh.*/
      pkt.istested[i] = TRUE;
   }
}
```

A.6  Forward Packet Procedure

```
char ForwardPacket(pkt, addtests)
{
   if (pkt.topology[nodeid]== -1){
     if (  neighbor, neighid | ((pkt.from[neighid]==-1)
                           && (tests[i] == FaultFree))
        SendPacket(pkt, neighid);              /*forward to child*/
     else if (  fault-free neighbor, neighid |
                             pkt.from[neighid]==-1){
        SendPacket(pkt, neighid);              /*forward to child*/
        if (addtests) tests[neighid] = FaultFree;
     } else if (pkt.from[nodeid] != nodeid)
        SendFacket(pkt, pkt.from[nodeid]);     /*return to parent*/
     else return(FALSE);                       /*completed root*/
   } else {
     if (  neighbor, neighid | ((pkt.from[neighid]==-1)
                           && (pkt.topology[neighid] == nodeid))
        Sendpacket(pkt, neighid);              /*to child*/
     else if (pkt.topology[nodeid] != nodeid)
        SendPacket(pkt, pkt.topology[nodeid]); /*to parent*/
     else return(FALSE);                       /*completed root*/
   }
   return(TRUE);
}
```

A.7  Receive Packet Procedure

```
ReceivePacket(pkt, fromid)
{
```

```
if (pkt.event[nodeid] > event[nodeid]) {  /*resynch my*/
  event[nodeid] = ptk.event[nodeid];       /*event time*/
  StartEventPacket();                       /*after restart*/
}
for (i=0, olddata=FALSE, newdata=FALSE; i<nodenum; i++){
  if (pkt.from[i] ==i) rootid=i;           /*find root node*/
  if (pkt.event[i] > event[i]){
    newdata = TRUE;                         /*update node*/
    event[i] = pkt.event[i];
    testrootid = -1;
  } else if (pkt.event[i] <event[i]) {
    olddata = TRUE;                         /*update packet*/
    pkt.event[i] = current[i];
  }
}
if (olddata) for (i=0; i<nodenum; i++) pkt.topology[i] = -1;
if (pkt.from[nodeld]== -1)               /*first visit*/
  pkt.from[nodeid] = fromid;              /*set parent*/
  if (topology[nodeid] !=-1)              /*implies olddata*/
    if (newdata || (rootid> testrootid)){ /*if new or*/
      SetTests(pkt);                      /*equal with tie*/
      testrootid = rootid;                /*breaker valid*/
    }
}
if (!ForwardPacket(pkt, newdata))        /*implies root node*/
  if (pkt.rootevent == event[nodeid])    /*current packet*/
    if (topology[nodeid]== -1)           /*packet updated*/
      if (newdata || (nodeid> testrootid)) {
        for (i=0, i<nodenum, i++) {
          pkt.event[i] = event[i];
          pkt.topology[i] = pkt.from[i];
          pkt.from[i] = -1;
          pkt.istested[i] = -1;
        }
        pkt.from[nodeid] = nodeid;
        SetTests(pkt);
        testrootid = nodeid;
        ForwardPacket(pkt, FALSE);
      }
}
```

A.8 Send Packet Procedure

```
SendPacket(pkt, toid)                    /*send packet, test implied*/
{
  Send message with pkt to node toid;
  if (message not acknowledged) StartEventPacket();
}
```

What is claimed:

1. An on-line adaptive distributed diagnostic system for a network of arbitrary topology, comprising:

N nodes where N is greater than or equal to three, each node having a state of either faulty or fault-free;

M communication links where M is greater than or equal to two, each link having a state of either faulty or fault-free and each node being in direct communication with at least one neighboring node through one of the links;

means associated with each node for directly testing a neighboring node, the determination of which neighboring node to test being based on a testing assignment associated with the network;

means associated with each node for indirectly communicating with a non-neighboring node through intervening nodes such that each node can be furnished with diagnostic information about a non-neighboring node in the network;

means associated with each node for coordinating the performance of diagnosis by it with the performance of diagnosis by another node in the network, whereby the need for central synchronization is eliminated;

means for maintaining diagnosis in the absence of a state change by any of the nodes and links; and means for restoring diagnosis in the presence of a state change by any of the nodes by adaptively replacing the testing assignment with a new independent testing assignment such that every node in the network is tested by a fault-free node.

2. The system of claim 1 wherein each fault-free node is in communication with every other fault-free node.

3. The system of claim 1 wherein the restoring means further restores diagnosis in the presence of a state change by any of the links.

4. The system of claim 1 wherein each node comprises a processor.

5. The system of claim 1 wherein the direct testing means comprises a memory and a computer program stored in the memory.

6. The system of claim 1 wherein the restoring means adaptively changes the testing assignment at each node based on results of tests performed at that node by the direct testing means and based on any diagnostic information furnished to that node from any non-neighboring nodes.

7. The system of claim 1 wherein the indirect communication means comprises message packets.

8. The system of claim 1 wherein the direct testing means periodically tests a neighboring node.

9. The system of claim 1 wherein each node activates the restoring means by propagating a message packet when the node detects a state change of another node that it is directly testing.

10. The system of claim 9 wherein the restoring means is deactivated when a message packet has traversed the network without being updated.

* * * * *